Figures 1, 2:
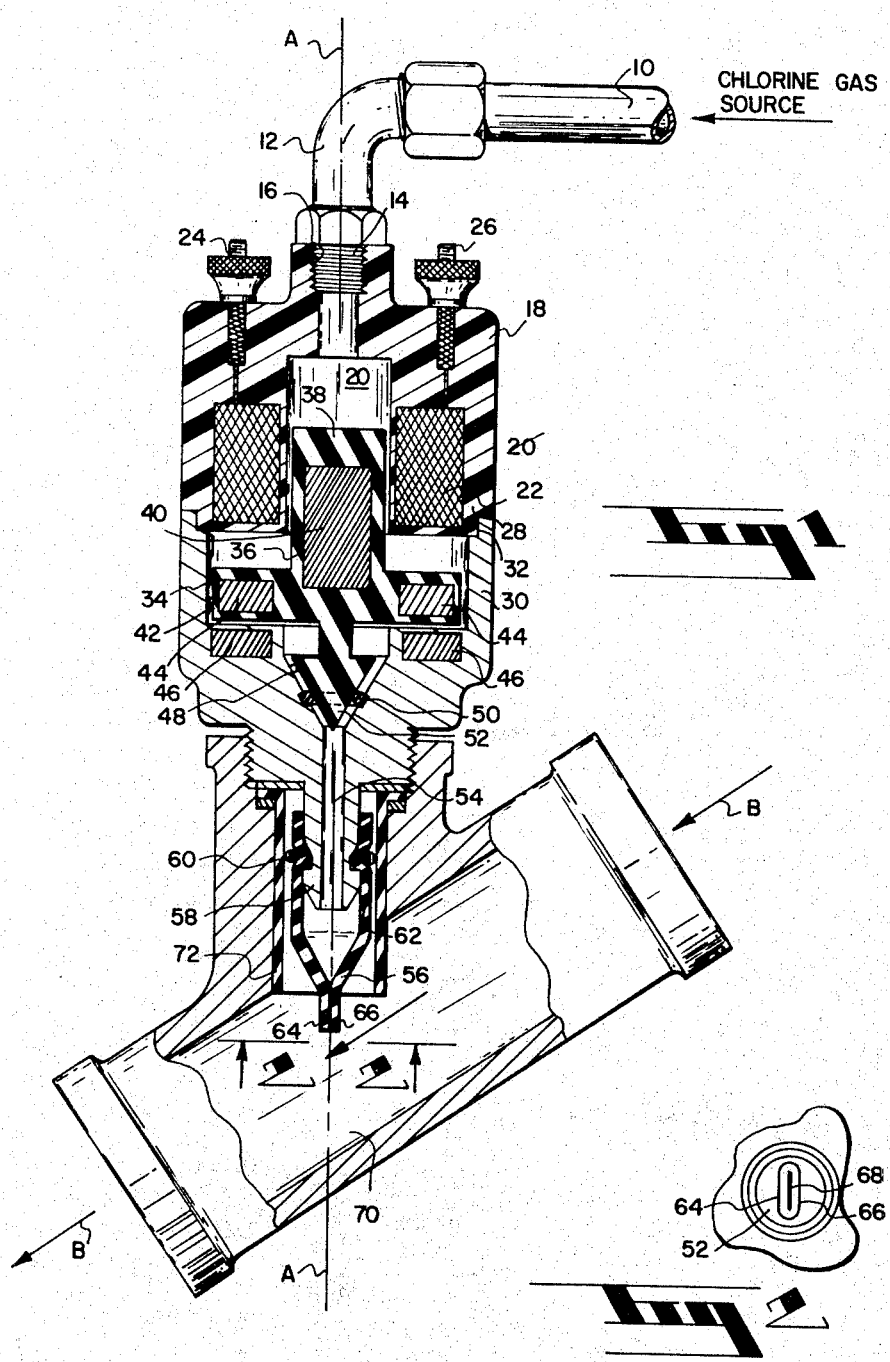

Jan. 2, 1968   T. F. SCHWARTZ   3,361,161
CHLORINATING VALVE
Filed Sept. 20, 1965

INVENTOR.
THEODORE F. SCHWARTZ
BY
Wm. H. Dean

United States Patent Office 3,361,161
Patented Jan. 2, 1968

3,361,161
CHLORINATING VALVE
Theodore F. Schwartz, 11660 St. Andrews Way,
Scottsdale, Ariz. 85251
Filed Sept. 20, 1965, Ser. No. 488,540
12 Claims. (Cl. 137—604)

This invention relates to a chlorinating valve, and more particularly to a valve adapted for use in the induction of chlorine or chlorine gas into a water flow stream, such as used in the circulating and filtering systems for swimming pools.

It has been a problem to produce a suitable chlorinating valve for use in automatic chlorinating systems for swimming pool water, or the like, due to the fact that chlorine gas or fluid chlorine when added to water, creates hydrochloric acid having highly active characteristics. Most valves employing brass or ferrous parts are rapidly deteriorated by the action of hydrochloric acid and soon tend to become inoperative, due to leakage and are, thus, rendered dangerous, since they may permit the escape of chlorine gas or may over chlorinate the water in a swimming pool system.

Accordingly, it is an object of the present invention to provide a chlorinating valve, particularly adapted for use in adding fluid or gas chlorine to a water flow stream; said valve being provided with electromagnetic means for opening the valve and permanent magnetic means for closing the valve in a fail safe condition and all of the magnet means being encapsulated in plastic material particularly adapted to resist the corrosive effects of chlorine.

Another object of the invention is to provide a novel chlorinating valve construction in which a main valve body and an electromagnet armature encapsulate and contain the desired magnetically responsive means and permanent magnet means; said valve body and armature body being cast around the magnetically responsive means and permanent magnet means, such as to completely encapsulate and protect these metallic elements from the effects of chlorine gas; the main valve body also completely encapsulating and protecting the winding of the electromagnetic means of the invention to thereby provide a very durable and fail safe chlorinating valve.

Another object of the invention is to provide a novel chlorinating valve having a novel corrosion resistant check valve, at the outlet thereof, which may be disposed in a water flow conduit to be washed by water passing therethrough; said check valve being of resilient corrosion resistant material and formed with an outlet comprising a pair of contiguous flat walls resiliently urged together by the resilient material of the check valve, and also, urged together by water pressure in the water flow conduit to prevent water from flowing backwardly into the chlorinating valve structure of the invention.

Further objects and advantages of the present invention may be apparent from the following specification, appended claims, and accompanying drawings, in which:

FIG. 1 is an axial sectional view of a chlorinating valve, in accordance with the present invention, showing parts and portions in elevation to facilitate the illustration; and FIG. 2 is a fragmentary view taken from the line 2—2 of FIG. 1, showing an end portion of a resilient check valve of the present invention.

As shown in FIG. 1 of the drawings, a source of chlorine gas or fluid communicates with a conduit 10 connected to a fitting 12 having a screw-threaded nipple portion 14 screw-threadably connected to an internally screw-threaded bore 16 of a main valve body 18 of the invention. The portion 14 communicates with the interior of a chlorine flow passage 20 which is concentrically disposed in the main valve body 18. This main valve body 18 is circular in cross-section about a central axis, as indicated by the line A in FIG. 1 of the drawings, passage 20 being circular in cross-section and surrounding this passage 20 is a solenoid coil 22 which is cast in the valve body 18 and completely encapsulated by plastic material of the valve body 18, said plastic material being highly resistant to chlorine gas or fluid.

Coupled to the solenoid coil 22 are terminal posts 24 and 26 which may be electrically connected to a conventional programmer, which is no part of the present invention, but which is adapted to energize the solenoid coil 22 in response to the requirement for the addition of chlorine to a water supply.

The main valve body 18 is composed of two parts 28 and 30 which are fused together at an annular overlapping ledge portion 32 by a common plastic material.

The portion 30 of the main valve body 18 is provided with an enlarged bore 34 concentric with the chlorine passage 20 and forming a continuity thereof.

Positioned in the passage 20 and the enlarged bore 34 is an armature body 36 having a small diameter portion 38 in which a magnetically responsive element 40 of ferrous material is cast and completely surrounded and encapsulated in the plastic material of the armature body 36, such as to be remote from any chlorine gas or fluid passing through the passage 20.

It will be noted that the passage 20 is larger in diameter than the portion 38 of the armature body, such as to permit gas to flow through the passage 20 around the small diameter portion 38 of the armature body.

Disposed in the bore 34 is an enlarged diameter portion 42 of the armature body 36 and cast in this enlarged diameter portion 42 is permanent magnet means 44, preferably ring-shaped, and having north and south bolts separated in a direction longitudinally of the axis A. It will be seen that the bore portion 34 is substantially longer than the axial length of the enlarged portion 42 of the armature body, so that the armature body, at the enlarged portion 42, may have sufficient axial play longitudinally along the axis A to permit attraction of the magnetically responsive means 40 by the energized coil 22, so that the armature body may be moved toward the inlet fitting 14 and when the coil 22 is de-energized to permit the permanent magnet means 44 to be attracted by a further permanent magnet means 46 which is cast in the main valve body portion 30 in substantial alignment with the permanent magnet means 44. This permanent magnet means 46 is preferably ring-shaped and has its north and south poles spaced axially along the axis A, so as to be attractive to the permanent magnet means 44. It will be understood that the polarity of these permanent magnets 44 and 46 are compatible to attract each other.

The permanent magnet means 46 is completely surrounded and capsulated in the chlorine resisting plastic material of the main valve body portion 30, such that all of the elements, including the coil 22, the magnetically responsive means 40, the permanent magnets 44 and 46 are all encapsulated by the plastic, completely surrounded and protected from the effects of chlorine gas or fluid, which may pass through the passage 20 and the bore 34.

A continuity of the bore 34 comprises a reduced conical bore 48 carrying an O-ring seal 50 provides one element of a shut-off valve structure of the invention. Another element of the valve structure, designated 52, is an integral conical portion of the armature body 36 which extends downwardly into the conical bore 48 and is engageable concentrically with the O-ring seal 50. This O-ring seal 50 is preferably a resilient compressible seal member adapted to form intimate contact with the conical periphery of the conical valve element 52.

Communicating with the interior of the conical bore 48 is an outlet passage 54 which is surrounded by a tubular hollow resilient check valve structure 56 surrounding a neck portion 58 of the main valve body portion 30. This neck portion 58 being a small diameter neck portion forming a conduit wall around the outlet passage 54.

A plastic compression ring 60 holds the periphery of the resilient tubular check valve body compressively engaged around a peripheral groove 62 of the portion 58.

The check valve 56 is provided with a pair of flat parallel contiguous wall portions 64 and 66 which are contiguous at a slit portion 68; the resilient character of the material tending to hold the walls 64 and 66 contiguous and engaged at the slit portion 68, as shown in FIG. 2 of the drawings. Additionally, fluid pressure in a liquid flow conduit 70, also, tends to force the walls 64 and 66 together to form a contiguous seal at the slit 68.

A substantially rigid protector tube 72 surrounds the resilient check valve 56 to prevent undue deflection thereof, by water flowing through the water flow conduit 70 in the direction of arrows B.

In operation, the solenoid coil 22 may be energized through conductors connected with the terminal posts 24 and 26 by a suitable programming device, which is no part of the present invention. When the solenoid coil 22 is energized, the magnetically responsive member is attracted in a direction toward the inlet fitting 14, thus, the solenoid magnet pulls the permanent magnet 44 away from the permanent 46 and opens the conical valve element 58 with respect to the O-ring valve 50 permitting chlorine gas to flow through the chlorine passage 22, bore 34, conical passage 48 into the outlet passage 54 and to pressurize the interior of the resilient check valve 56 and cause opening of the wall portions 64 and 66, thereby separating them at the slit 68 and permitting chlorine gas or fluid to be inducted into water flowing through the conduit 70 in the direction of the arrows B.

When the solenoid coils de-energize, the magnets 44 and 46 attract each other, forcing the conical valve element 52 to engage the valve element 50 and shut-off flow of chlorine through the valve. At this time, the resilient character of the check valve 56 causes the flat walls 64 and 66, to become contiguous at the slitted portion 68 and, at the same time, pressure of fluid in the flow conduit 70 also tends to close the flat wall portions 64 and 66 contiguously against each other at the slit 68, thus, preventing backflow of water into the chlorinating valve structure of the present invention.

It will be appreciated by those skilled in the art that the cast main valve body and armature body encapsulating all of the ferrous elements and the electrical winding of the coil 22 prevents corrosion of these elements and provides for a very durable chlorinating valve.

It will be obvious to those skiled in the art that various modifications of the present invention may be resorted to in a manner limited only by a just interpretation of the following claims.

I claim:

1. In a chlorinating valve the combination of: a main valve body having a fluid flow passage centrally disposed therein; a ring-shaped solenoid coil cast in said body and surrounding said passage; an armature body having a magnetically responsive member cast therein; a first portion of said armature body in said passage disposed concentrically with said coil; said passage having a greater cross-sectional area than said first portion to allow fluid to pass through said passage around said first portion; an enlarged section of said armature body spaced from said coil; first permanent magnetic means cast in said enlarged portion; second permanent magnetic means cast in said main valve body adjacent to said enlarged portion and said first magnetic means; a first valve element carried by said armature body; a second valve element carried by said main valve body and cooperable with said first valve element to open or close said fluid flow passage; said first and second permanent magnetic means tending constantly to move said armature and said first valve element into closed contact with said second valve element to shut off flow through said fluid flow passage; said solenoid coil, when energized, being adapted to attract said magnetically responsive member and to force said first valve element away from said second valve element and to thereby open said fluid flow passage.

2. In a chlorinating valve the combination of: a main valve body having a fluid flow passage centrally disposed therein; a ring-shaped solenoid coil cast in said body and surrounding said passage; an armature body having a magnetically responsive member cast therein; a first portion of said armature body in said passage disposed concentrically with said coil; said passage having a greater cross-sectional area than said first portion to allow fluid to pass through said passage around said first portion; and enlarged section of said armature body spaced from said coil; first permanent magnetic means cast in said enlarged portion; second permanent magnetic means cast in said main valve body adjacent to said enlarged portion and said first magnetic means; a first valve element carried by said armature body; a second valve element carried by said main valve body and cooperable with said first valve element to open or close said fluid flow passage; said first and second permanent magnetic means tending constantly to move said armature and said first valve element into closed contact with said second valve element to shut off flow through said fluid flow passage; said solenoid coil, when energized, being adapted to attract said magnetically responsive member and to force said first valve element away from said second valve element and to thereby open said fluid flow passage; a fluid flow conduit; and outlet of said fluid flow passage communicating with the interior of said fluid flow conduit; and a check valve disposed to prevent flow into said outlet from said water flow conduit, but permitting fluid flow from said outlet into said fluid flow conduit.

3. In a chlorinating valve the combination of: a main valve body having a fluid flow passage centrally disposed therein; a ring-shaped solenoid coil cast in said body and surrounding said passage; an armature body having a magnetically responsive member cast therein; a first portion of said armature body in said passage disposed concentrically with said coil; said passage having a greater cross-sectional area than said first portion to allow fluid to pass through said passage around said first portion; an enlarged section of said armature body spaced from said coil; first permanent magnetic means cast in said enlarged portion; second permanent magnetic means cast in said main valve body adjacent to said enlarged portion and said first magnetic means; a first valve element carried by said armature body; a second valve element carried by said main valve body and cooperable with said first valve element to open or close said fluid flow passage; said first and second permanent magnetic means tending constantly to move said armature and said first valve element into closed contact with said second valve element to shut off flow through said fluid flow passage; said solenoid coil, when energized, being adapted to attract said magnetically responsive member and to force said first valve element away from said second valve element and to thereby open said fluid flow passage; a fluid flow conduit; an outlet of said fluid flow passage communicating with the interior of said fluid flow conduit; and a check valve disposed to prevent flow into said outlet from said water flow conduit, but permitting fluid flow from said outlet into said fluid flow conduit; said check valve being a tubular resilient structure having a flattened slitted outlet end tending to hold said slitted portion closed and subject to fluid pressure tending to hold said slitted portion closed.

4. In a chlorinating valve the combination of: a main valve body having a fluid flow passage centrally disposed therein; a ring-shaped solenoid coil cast in said body and surrounding said passage; an armature body having a magnetically responsive member cast therein; a first portion of said armature body in said passage disposed concentrically with said coil; said passage having a greater cross-sectional area than said first portion to allow fluid to pass through said passage around said first portion; an enlarged section of said armature body spaced from said coil; first permanent magnetic means cast in said enlarged portion; second permanent magnetic means cast in said main valve body adjacent to said enlarged portion and said first magnetic means; a first valve element carried by said armature body; a second valve element carried by said main valve body and cooperable with said first valve element to open or close said fluid flow passage; said first and second permanent magnetic means tending constantly to move said armature and said first valve element into closed contact with said second valve element to shut off flow through said fluid flow passage; said solenoid coil, when energized, being adapted to attract said magnetically responsive member and to force said first valve element away from said second valve element and to thereby open said fluid flow passage; a fluid flow conduit; an outlet of said fluid flow passage communicating with the interior of said fluid flow conduit; and a check valve disposed to prevent flow into said outlet from said water flow conduit, but permitting fluid flow from said outlet into said fluid flow conduit; said check valve being a tubular resilient structure having a flattened slitted outlet end tending to hold said slitted portion closed and subject to fluid pressure tending to hold said slitted portion closed; said flattened slitted outlet disposed to be washed by fluid in said conduit.

5. In a chlorinating valve the combination of: a main valve body having a fluid flow passage centrally disposed therein; a ring-shaped solenoid coil cast in said body and surrounding said passage; an armature body having a magnetically responsive member cast therein; a first portion of said armature body in said passage disposed concentrically with said coil; said passage having a greater cross-sectional area than said first portion to allow fluid to pass through said passage around said first portion; an enlarged section of said armature body spaced from said coil; first permanent magnetic means cast in said enlarged portion; second permanent magnetic means cast in said main valve body adjacent to said enlarged portion and said first magnetic means; a first valve element carried by said armature body; a second valve element carried by said main valve body and cooperable with said first valve element to open or close said fluid flow passage; said first and second permanent magnetic means tending constantly to move said armature and said first valve element into closed contact with said second valve element to shut off flow through said fluid flow passage; said solenoid coil, when energized, being adapted to attract said magnetically responsive member and to force said first valve element away from said second valve element and to thereby open said fluid flow passage; a fluid flow conduit; an outlet of said fluid flow passage communicating with the interior of said fluid flow conduit; and a check valve disposed to prevent flow into said outlet from said water flow conduit, but permitting fluid flow from said outlet into said fluid flow conduit; said check valve being a tubular resilient structure having a flattened slitted outlet end tending to hold said slitted portion closed and subject to fluid pressure tending to hold said slitted portion closed; said flattened slitted outlet disposed to be washed by fluid in said conduit; a substantially rigid tubular protector surrounding said tubular resilient structure of said check valve to prevent undue deflection thereof by fluid flowing in said fluid flow conduit.

6. In a chlorinating valve the combination of: a main valve body of chlorine resisting plastic material having a chlorine flow passage centrally disposed in said body; a ring-shaped solenoid coil cast in said body and surrounding said chlorine passage, said coil completely surrounded and encapsulated by said plastic material of said main valve body; an armature body of chlorine resisting plastic material having a magnetically responsive member cast therein and completely surrounded and encapsulated by said plastic material of said armature body; a first portion of said armature body in said passage concentrically with said coil and containing said magnetically responsive member; said passage having a greater cross-sectional area than said first portion to allow chlorine to pass through said passage around said first portion; an enlarged section of said armature body spaced from said coil; first permanent magnetic means cast in said enlarged portion and completely surrounded and encapsulated by said plastic material of said armature body; second permanent magnet means cast in said main valve body adjacent to said enlarged portion and said first magnetic means; said second permanent magnetic means completely surrounded and encapsulated by said plastic material of said main valve body; a first valve element carried by said armature body; a second valve element carried by said main valve body and cooperable with said first valve element to open or close said chlorine passage; said first and second permanent magnet means tending constantly to move said armature and said first valve element into close contact with said second valve element to shut off fluid flow through said chlorine passage; said solenoid coil, when energized, being adapted to attract said magnetically responsive member and to force said first valve element away from said second valve element and to thereby open said fluid flow passage.

7. In a chlorinating valve the combination of: a main valve body having a fluid flow passage centrally disposed therein; a ring-shaped solenoid coil cast in said body and surrounding said passage; an armature body having a magnetically responsive member cast therein; a first portion of said armature body in said passage disposed concentrically with said coil; said passage having a greater cross-sectional area than said first portion to allow fluid to pass through said passage around said first portion; an enlarged section of said armature body spaced from said coil; first permanent magnetic means cast in said enlarged portion; second permanent magnetic means cast in said main valve body adjacent to said enlarged portion and said first magnetic means; a first valve element carried by said armature body; a second valve element carried by said main valve body and cooperable with said first valve element to open or close said fluid flow passage; said first and second permanent magnetic means tending constantly to move said armature and said first valve element into closed contact with said second valve element to shut off flow through said fluid flow passage; said solenoid coil, when energized, being adapted to attract said magnetically responsive member and to force said first valve element away from said second valve element and to thereby open said fluid flow passage; said fluid flow passage, coil and armature, all being annular and axially aligned with said first and second valve element.

8. In a chlorinating valve the combination of: a main valve body having a fluid flow passage centrally disposed therein; a ring-shaped solenoid coil cast in said body and surrounding said passage; an armature body having a magnetically responsive member cast therein; a first portion of said armature body in said passage disposed concentrically with said coil; said passage having a greater cross-sectional area than said first portion to allow fluid to pass through said passage around said first portion; an enlarged section of said armature body spaced from said coil; first permanent magnetic means cast in said enlarged portion; second permanent magnetic means cast in said main valve body adjacent to said enlarged portion and said first magnetic means; a first valve element carried by said armature body; a second valve element carried by said main valve body and cooperable with said first valve element to open or close said fluid flow passage; said first and second permanent magnetic means tending constantly to move said armature and said first valve element into closed contact with said second valve element to shut off flow through said fluid flow passage; said solenoid coil, when energized, being adapted to attract said magnetically responsive member and to force said first valve element away from said second valve element and to thereby open said fluid flow passage; one of said valve elements being a compressible O-ring.

9. In a chlorinating valve the combination of: a main valve body having a fluid flow passage centrally disposed therein; a ring-shaped solenoid coil cast in said body and surrounding said passage; an armature body having a magnetically responsive member cast therein; a first portion of said armature body in said passage disposed concentrically with said coil; said passage having a greater cross-sectional area than said first portion to allow fluid to pass through said passage around said first portion; an enlarged section of said armature body spaced from said coil; first permanent magnetic means cast in said enlarged portion; a second permanent magnetic means cast in said main valve body adjacent to said enlarged portion and said first magnetic means; a first valve element carried by said armature body; a second valve element carried by said main valve body and cooperable with said first valve element to open or close said fluid flow passage; said first and second permanent magnetic means tending constantly to move said armature and said first valve element into closed contact with said second valve element to shut off flow through said fluid flow passage; said solenoid coil, when energized, being adapted to attract said magnetically responsive member and to force said first valve element away from said second valve element and to thereby open said fluid flow passage; a fluid flow conduit; an outlet of said fluid flow passage communicating with the interior of said fluid flow conduit; and a check valve disposed to prevent flow into said outlet from said water flow conduit, but permitting fluid flow from said outlet into said fluid flow conduit; said check valve being a tubular structure of resilient material having a flattened outlet portion comprising a pair of contiguous flat walls resiliently urged together by the resilient character of said last mentioned material.

10. In a chlorinating valve the combination of: a main valve body of chlorine resisting plastic material having a chlorine flow passage centrally disposed in said body; a ring-shaped solenoid coil cast in said body and surrounding said chlorine passage, said coil completely surrounded and encapsulated by said plastic material of said main valve body; an armature body of chlorine resisting plastic material having a magnetically responsive member cast therein and completely surrounded and encapsulated by said plastic material of said armature body; a first portion of said armature body in said passage concentrically with said coil and containing said magnetically responsive member; said passage having a greater cross-sectional area than said first portion to allow chlorine to pass through said passage around said first portion; an enlarged section of said armature body spaced from said coil; first permanent magnet means cast in said enlarged portion and completely surrounded and encapsulated by said plastic material of said armature body; second permanent magnet means cast in said main valve body adjacent to said enlarged portion and said first magnetic means; said second permanent magnetic means completely surrounded and encapsulated by said plastic material of said main valve body; a first valve element carried by said armature body; a second valve element carried by said main valve body and cooperable with said first valve element to open or close said chlorine passage; said first and second permanent magnet means tending constantly to move said armature and said first valve element into close contact with said second valve element to shut off fluid flow through said chlorine passage; said solenoid coil, when energized, being adapted to attract said magnetically responsive member and to force said first valve element away from said second valve element and to thereby open said fluid flow passage; said chlorine passage, coil and armature, all being anular and axially aligned with said first and second valve elements.

11. In a chlorinating valve the combination of: a main valve body of chlorine resisting plastic material having a chlorine flow passage centrally disposed in said body; a ring-shaped solenoid coil cast in said body and surrounding said chlorine passage, said coil completely surrounded and encapsulated by said plastic material of said main valve body; an armature body of chlorine resisting plastic material having a magnetically responsive member cast therein and completely surrounded and encapsulated by said plastic material of said armature body; a first portion of said armature body in said passage concentrically with said coil and containing said magnetically responsive member; said passage having a greater cross-sectional area than said first portion to allow chlorine to pass through said passage around said first portion; an enlarged section of said armature body spaced from said coil; first permanent magnet means cast in said enlarged portion and completely surrounded and encapsulated by said plastic material of said armature body; second permanent magnet means cast in said main valve body adjacent to said enlarged portion and said first magnetic means; said second permanent magnetic means completely surrounded and encapsulated by said plastic material of said main valve body; a first valve element carried by said armature body; a second valve element carried by said main valve body and cooperable with said first valve element to open or close said chlorine passage; said first and second permanent magnet means tending constantly to move said armature and said first valve element into close contact with said second valve element to shut off fluid flow through said chlorine passage; said solenoid coil, when energized, being adapted to attract said magnetically responsive member and to force said first valve element away from said second valve element and to thereby open said fluid flow passage; a fluid flow conduit; an outlet of said chlorine passage communicating with the interior of said fluid flow conduit; and a check valve disposed to prevent flow from said fluid flow conduit into said outlet and to permit chlorine to flow from said outlet into said fluid flow conduit.

12. In a chlorinating valve the combination of: a main valve body of chlorine resisting plastic material having a chlorine flow passage centrally disposed in said body; a ring-shaped solenoid coil cast in said body and surrounding said chlorine passage, said coil completely surrounded and encapsulated by said plastic material of said main valve body; an armature body of chlorine resisting plastic material having a magnetically responsive member cast therein and completely surounded and encapsulated by said plastic material of said armature body; a first portion of said armature body in said passage concentrically with said coil and containing said magnetically responsive member; said passage having a greater cross-sectional area than said first portion to allow chlorine to pass through said passage around said first portion; an enlarged section of said armature body spaced from said coil; first permanent magnet means cast in said enlarged portion and completely surrounded and encapsulated by said plastic material of said armature body; second permanent magnet means cast in said main valve body adjacent to said enlarged portion and said first magnetic means; said second permanent magnetic means completely surrounded and encapsulated by said plastic material of said main valve body; a first valve element carried by said armature body; a second valve element carried by said main valve body and cooperable with said first valve element to open or close said chlorine passage; said first and second permanent magnet means tending constantly to move said armature and said first valve element into close contact with said second valve element to shut off fluid flow through said chlorine passage; said solenoid coil, when energized, being adapted to attract said magnetically responsive member and to force said first valve element away from said second valve element and to thereby open said fluid flow passage; a fluid flow conduit; an outlet of said chlorine passage communicating with the interior of said fluid flow conduit; and a check valve disposed to prevent flow from said fluid flow conduit into said outlet and to permit chlorine to flow from said outlet into said fluid flow conduit; said check valve being a tubular structure of resilinet material having a flattened outlet portion comprising a pair of contiguous flat walls resiliently urged together by the resilient character of said resilient material, said resilient material being a chlorine resisting material.

References Cited

UNITED STATES PATENTS

| | | | |
|---|---|---|---|
| 1,430,263 | 9/1922 | Sage | 137—604 X |
| 2,619,116 | 11/1952 | Ralston | 251—139 X |
| 2,731,027 | 1/1956 | Daun | 137—525.1 X |
| 2,869,563 | 1/1959 | Schoengrun | 251—65 X |
| 3,235,223 | 2/1966 | Wintriss | 251—141 |
| 3,245,652 | 4/1966 | Roth | 251—141 X |
| 3,289,697 | 12/1966 | Kozel et al. | 251—141 X |

FOREIGN PATENTS 1,343,783   10/1963   France.

OTHER REFERENCES

IBM Technical Disclosure Bulletin, "Membrane Valve," G. Hellbardt and M. Michelitsch, vol. 7, No. 7, December 1964, p. 602.

WILLIAM F. O'DEA, *Primary Examiner.*

D. H. LAMBERT, *Assistant Examiner.*